June 9, 1964 R. S. WILKES ETAL 3,136,556
MATERIAL UNLOADER WITH FLAIL BEATER AND HOOD
Filed Jan. 14, 1959 2 Sheets-Sheet 1
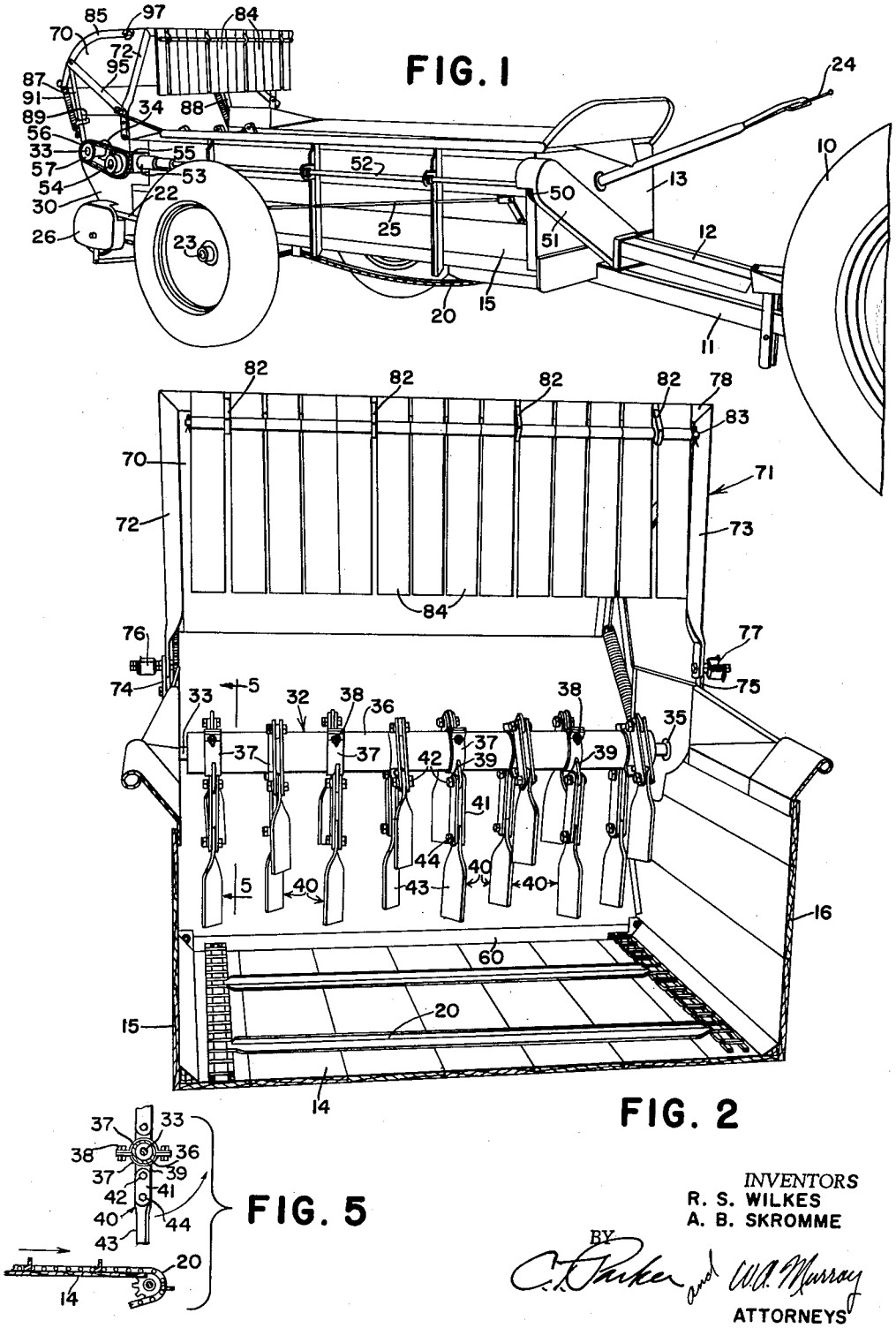
INVENTORS
R. S. WILKES
A. B. SKROMME
BY
ATTORNEYS

INVENTORS
R. S. WILKES
A. B. SKROMME
ATTORNEYS

United States Patent Office 3,136,556
Patented June 9, 1964

3,136,556
MATERIAL UNLOADER WITH FLAIL BEATER
AND HOOD
Raymond S. Wilkes and Arnold B. Skromme, Moline, Ill.,
assignors to Deere & Company, Moline, Ill., a corporation of Delaware
Filed Jan. 14, 1959, Ser. No. 786,813
9 Claims. (Cl. 275—6)

This invention relates to a material unloader and more particularly to a method of discharging material from the rear end of an elongated material container or box, using a flail beater and hood.

In the conventional type of manure spreader presently being produced, there is provided an elongated box having transversely spaced apart sides extending upwardly from the floor of the box. A floor conveyor moves material rearwardly to an open rear end of the box where a series of beaters and widespreads tend to break up the manure and to spread the manure both rearwardly and to the side of the box. Normally there are provided two beater rotors and a widespread which obviously require a drive for operating the three shafts either in unison or in some instances individually. The beaters consist of a series of axially spaced rigid arms affixed to a shaft which operates to claw the material moving rearwardly by the floor conveyor. The widespread consists generally of a flight type member which engages the material leaving the beater arms and discharges the material to opposite sides of the container.

It is the primary object of the present invention to provide a new and novel type of rotor structure at the rear end of the spreader box which both pulverizes the material moving rearwardly by the floor conveyor and also, due to its construction, throws the material to opposite sides of the spreader. The present invention will incorporate only the use of one shaft and obviously will require only a single drive for operating the entire rotor structure.

A further object of the invention is to provide a hood over the rotor structure and to mount the hood on the side walls of the box so that the hood may be swung between a position overlying the rotor and one to the rear of the rotor, and when in the latter position to be so located so as to close the open rear end of the box.

A further object of the present invention is to incorporate with the above described features an apron extending from the rear edge of the floor which may be adjustably inclined so that material feeding rearwardly from the rotor may move from the box in an upward and rearward direction.

Other objects and advantages of the invention will become apparent to those skilled in the art as the nature of the invention is better understood from the following description and as shown in the accompanying drawings.

FIG. 1 is a front and side perspective view of the material unloader and a portion of the tractor.

FIG. 2 is a front perspective view looking down and rearwardly into the rear portion of the material unloader.

FIG. 5 is a vertical sectional view taken substantially along the line 5—5 of FIG. 2.

Figure 3:
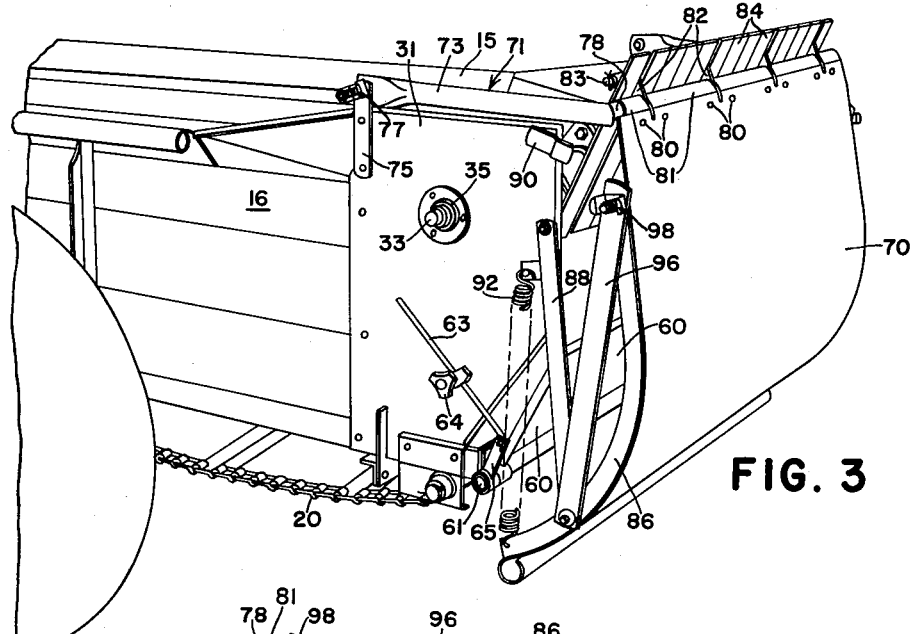
FIG. 3 is a side and rear perspective view of the rear portion of the spreader showing the hood mechanism in one position.

Referring to FIG. 1, the implement is drawn by the rear end of a tractor, shown only partially by the right rear traction wheel 10. The tractor has a draw bar, not shown, on which is connected a forwardly extending tongue or draft member 11 rigid with the frame of the implement. The tractor also has a conventional type power take-off shaft, also not shown, to which is connected a forwardly extending drive shaft, not shown, but mounted under a safety shield 12.

The implement further includes a material containing box having a forward upright wall 13, a floor 14, and transversely spaced side walls 15, 16. The conveyor has an open rear end through which material may normally be discharged.

A raddle type floor conveyor is provided with its upper run moving over and rearwardly relative to the floor 14. The conveyor 20 extends substantially the length of the floor and from front to rear so that material may be moved from the forward end of the container to the rear discharge end. The conveyor 20 is driven by a pawl and ratchet mechanism 21 (FIG. 4) which receives its power through pitmans 22 connected to the rear transverse axle 23. The drive mechanism on the floor conveyor is controlled from the forward end by a lever mechanism 24 and a connecting rod 25. The exact nature of the control as well as the drive for the floor conveyor is not important for purpose of this invention, but should a more detailed description be desired, such may be had by reference to U.S. Patent 2,804,308.

Adjacent the rear ends of the side walls 15, 16 is a pair of reenforcing plates 30, 31. The plates 30, 31 as well as the portion of the walls 15, 16 adjacent thereto support a transverse rotor structure, indicated in its entirety by the reference numeral 32, comprising a transverse shaft 33 journaled at opposite ends by means of bearings 34, 35 in the plates 30, 31. Mounted on the shaft 33 inwardly of the walls 15, 16 is a transverse tubular member 36. Fixed to the outer surface of the tubular shaft 36 is a series of axially spaced semi-annular metal straps 37 flanged outwardly to receive bolts 38 which operate to tighten the straps on the shaft 36. The straps 37 are provided with radially extending lugs 39 on which are pivotally mounted the inner ends of flexible arms or flail structures, indicated in their entireties by the reference numeral 40. The flexible arms 40 are composed of inner portions 41 bolted, as at 42, for rotation on the lugs 39 and outer flail members 43 bolted, as at 44, to pivot on the outer ends of the arm portions 41. As will be noted from viewing FIGS. 2 and 4, the flail members 43 are formed or turned on themselves so that their outer free ends present surfaces inclined to the axis of the shaft 36. By turning the members 43 in this manner there exists wide areas of contact between the flail surfaces and the material to be discharged. The members 43 will also have leading or cutting edges to slice through the material. Also, the shape of the flail members 43 will tend to move the material axially in respect to the shaft axis.

Drive mechanism for rotating the shafts 33, 36 is provided and is comprised of a chain and sprocket drive, shown only partially at 50 in FIG. 1, fixed to the forward wall 13 of the spreader box. Safety shielding 51 is provided to cover the chain and sprocket drive 50. Extending rearwardly from the drive 50 is a drive shaft 52 journaled for rotation on the side wall 15 and terminating at its rear end in a gear transmission contained in a housing 53. The gear transmission is of the bevel gear type and terminates in an outwardly extending shaft 54 on which is mounted a sprocket 55 which receives a chain 56 mounted at its rear end over a drive sprocket 57 fixed to the transverse shaft 33. It will be noted after reviewing FIG. 5, that the direction of rotation of the rotor structure 32 is such that the underside of the rotor structure 32 moves rearwardly. Consequently, the flails 40 will bite into the material moving rearwardly by the conveyor 20 and will discharge the material rearwardly from the underside of the rotor. The free ends 43 of the rotor elements being turned outwardly will cause the material not only to move rearwardly but also outwardly of the spreader box.

Positioned adjacent the rear edge of the floor 14 is an apron or panel 60. The panel 60 is mounted upon a transverse pivot shaft 61 having supports bolted, as at 62, to the lower rear edge of the side walls 15, 16. The shaft 61 is free to pivot about a transverse axis and is controlled by means of an adjustable rod 63 extending through a clamping bolt 64 and having its rear end pivoted on a bracket 65 fixed to the shaft 61. By loosening the bolt 64, the rod 63 may be adjusted so as to vary the angle of inclination of the panel 60. Consequently, the angle of discharge of material off of the panel may be varied by adjusting the rod 63 in the adjusting bolts 64.

Further provided with the material unloader is a hood or covering member 70. The member 70, as will later become clear, is adapted to move from a position overlying the rotor structure 32 and a position rearwardly of the rotor structure. The latter position normally closes the rear end of the container and in the latter position the hood is clear of overhead abutments should the unloader be moved into a barn, cattle crib, or other type of low overhead building. In the former position, the hood obviously prevents material from flowing forwardly and serves as a safety shield guarding the operator on the tractor from flying debris. Further, the purpose of moving the hood into a position rearwardly of the rotor is to permit the container itself to be completely filled with material thereby increasing the capacity of the spreader. The hood is mounted on the container primarily by means of a forwardly positioned arch member 71 having depending leg portions 72, 73 bolted for pivotal movement at their lower ends to upwardly extending brackets 74, 75 fixed to the supporting plates 30, 31 respectively. The method of mounting the legs 72, 73 is by means of manually movable hand nuts 76, 77. The arch member 71 is further characterized by having an overlying bight portion 78 connecting the upper ends of the legs 72, 73. The forward end of the shield or hood 70 is riveted at 80 to tubular members 81 fitted on the portion 78 of the arch. The tubes 81 are spaced apart to provide annular slots through which forwardly extending brackets 82 fixed to the shaft 78 extend. The brackets 82 have transversely aligned openings for receiving a transverse shaft 83. The shaft 83 has depending grille bars 84 pivotally mounted thereon. The grille bars 84 are individually mounted on the shaft 83 and are normally biased by their weights into vertical position. Consequently, should the rotor structure contact a large foreign object and drive it forwardly, the grille bars 84 will deflect the foreign object and yet will deflect themselves sufficiently to prevent damage being done to the grille structure. The bars 84 are limited in their forward deflection by the upper portions of the bars contacting the tubular shaft 78.

The arms 82 (FIG. 3) will tend to swing up as the shield 70 is lowered. Consequently the upper ends of the grille members 84 will tend to rise when the shield is lowered. As the shield 70 is raised, the arms 82 tend to swing the grille members 84 downwardly relative to the shaft 78 so that the upper ends of the grille members 84 are in alinement with the shaft 78.

Figure 4:
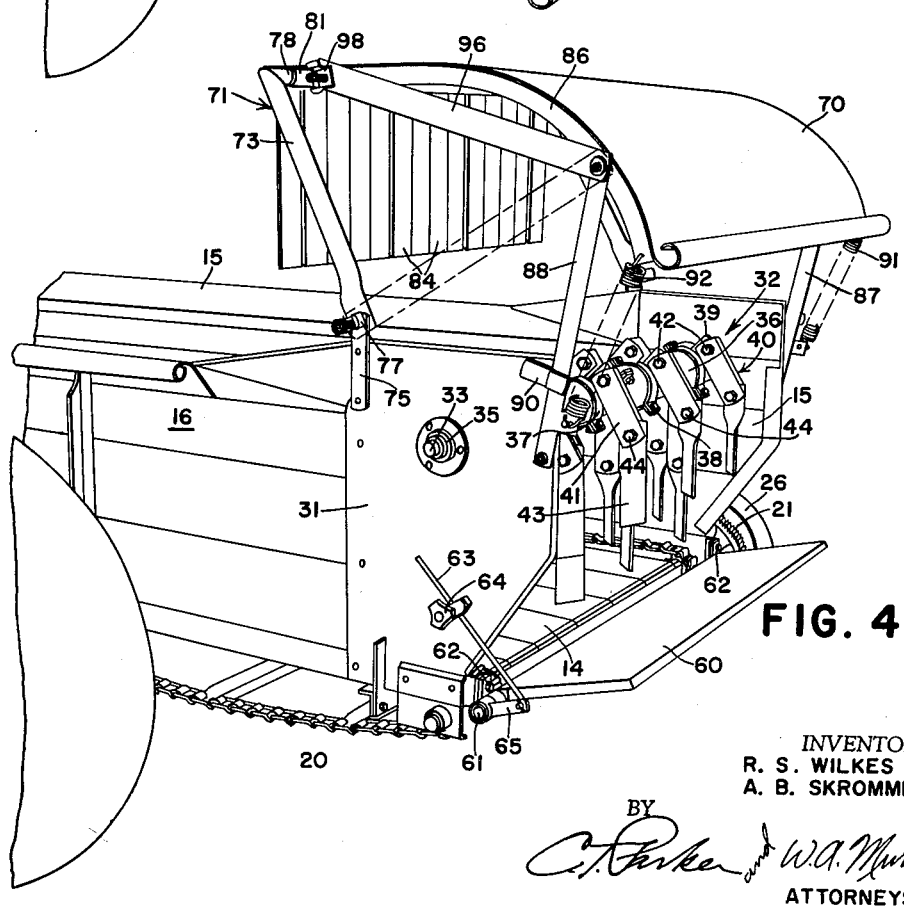
FIG. 4 is a view similar to FIG. 3 showing the hood mechanism in a raised or up position.

The hood or shield 70 is provided with vertical flanges 85, 86 at opposite edges thereof. Links 87, 88 pivotally connect the flanges 85, 86 to the rear end of the plate portions 30, 31. Consequently, the hood or shield 70 is free to swing about the legs 72, 73 and the links 87, 88. Stop lugs 89, 90 are provided on the faces of the shields 30, 31 and project rearwardly to engage the links 87, 88 so as to limit forward movement of the shield to a position overhead of the rotor structure 32. Balancing springs 91, 92 are provided between the flanges 85, 86 and side plates 30, 31 in order to ease the load in moving the hood structure between down and up positions. Locking links 95, 96 are further provided to prevent the hood 70 falling from its up to its down position. The links 95, 96 are mounted between fore-and-aft spaced portions of the flanges 85, 86 respectively when the hood is in a down position, such being shown clearly in FIG. 3. The links 95, 96 are pivoted at their rear end to swing vertically and are provided with manually operated thumb nuts 97, 98. When in the up position, as shown in FIG. 4, the locking links 95, 96 may be removed from the flanges 85, 86 and the forward ends may be dropped to be inserted over the bolts connecting the lower end of the legs 72, 73 of the arch members 71. The thumb nuts 76, 77 may then be tightened to prevent removal of the forward end of the links 95, 96 from the respective bolts. In this position, the links 95, 96 will prevent rearward movement of the hood structure.

While only one form of the invention has been shown, it should be understood that other forms and variations will occur to those skilled in the art. Therefore, while the present description is given in detail for the purpose of clearly and concisely illustrating the principles of the invention, it is not the intention to so limit or narrow the invention beyond the broad concept set forth in the appended claims.

What is claimed is:

1. A material unloader comprising: a mobile frame, a material container opening to its rear and including a floor and transversely spaced side walls extending upwardly from the floor; a floor conveyor moving material over the floor to the open rear end of the container; a transverse rotor structure mounted between said side walls adjacent the rear end of the container, said rotor structure comprising a transverse rotatable shaft, a plurality of axially spaced flexible arm elements having inner ends mounted on the shaft and radial outer free ends adaptable to swing adjacent the floor surface; means rotating the shaft whereby the underside of the rotor will move rearwardly to discharge material driven rearwardly by the floor conveyor; a transverse panel pivotally mounted for vertical swinging adjacent the rear edge of the floor and extending rearwardly therefrom; means connected to the panel for selectively fixing its inclination relative to the floor; an arcuate shaped hood member; means mounting the hood member on the container, said latter means being adaptable to swing said hood between a position overlying said rotor structure and a position rearward of the rotor structure, the hood when in said latter position closing the open rear end of the material container.

2. A material unloader comprising: a mobile frame; a material container opening to its rear and including a floor and transversely spaced side walls extending upwardly from the floor; a floor conveyor moving material over the floor to the open rear end of the container; a transverse rotor structure mounted between said side walls adjacent the rear end of the container, said rotor structure comprising a transverse rotatable shaft, a plurality of axially spaced flexible arm elements having inner ends mounted on the shaft and radial outer flail members turned axially on themselves to present surfaces inclined to the rotor axis; means rotating the shaft whereby the underside of the rotor will move rearwardly to discharge material driven rearwardly by the floor conveyor; a transverse arcuate shaped hood member; means mounting the hood member on the container, said latter means being adaptable to swing said hood between a position overlying said rotor structure and a position rearward of the rotor structure, the hood when in said latter position closing the open rear end of the material container; and a grille structure mounted in depending relation from the hood forwardly of the rotor for deflecting material issuing forwardly from the rotor.

3. A material unloader comprising: a mobile frame; a material container opening to its rear and including a floor and transversely spaced side walls extending upwardly from the floor; a floor conveyor moving material over the floor to the open rear end of the container; a transverse rotor structure mounted between said side walls adjacent the rear end of the container, said rotor structure comprising a transverse rotatable shaft, a plurality of axially spaced flexible arm elements having inner ends mounted on the shaft and radial outer flail members turned axially on themselves to present surfaces inclined to the rotor axis; means rotating the shaft whereby the underside of the rotor will move rearwardly to discharge material driven rearwardly by the floor conveyor; a transverse arcuate shaped hood member; and means mounting the hood member on the container, said latter means being adaptable to swing said hood between a position overlying said rotor structure and a position rearward of the rotor structure, the hood when in said latter position closing the open rear end of the material container.

4. A material unloader comprising: a mobile frame; a material container opening to its rear and including a floor and transversely spaced side walls extending upwardly from the floor; a floor conveyor moving material over the floor to the open rear end of the container; a transverse rotor structure mounted between said side walls adjacent the rear end of the container, said rotor comprising a transverse rotatable shaft, a plurality of axially spaced flexible arm elements having inner ends mounted on the shaft and radial outer flail members turned axially on themselves to present surfaces inclined to the rotor axis; means rotating the shaft whereby the underside of the rotor will move rearwardly to discharge material driven rearwardly by the floor conveyor; a transverse panel pivotally mounted for vertical swinging adjacent the rear edge of the floor and extending rearwardly therefrom; and means connected to the panel for selectively fixing its inclination relative to the floor.

5. A material unloader comprising: a mobile frame; a material container opening to its rear and including a floor and transversely spaced side walls extending upwardly from the floor; a floor conveyor moving material over the floor to the open rear end of the container; a transverse rotor structure mounted between said side walls adjacent the rear end of the container, said rotor structure comprising a transverse rotatable shaft, a plurality of axially spaced flexible arm elements mounted on the shaft with each being composed of inner sections supported on and extending radially from the shaft and having means at their outer ends defining transverse pivots substantially parallel to the axis of the shaft, and rigid outer radial flail members having inner ends supported on said outer ends to swivel about said pivots, said flail members being turned axially on themselves to present surfaces inclined relative to the rotor and pivot axes; and means rotating the shaft whereby the underside of the rotor will move rearwardly to contact material moving rearwardly on the floor conveyor.

6. The invention defined in claim 5 further characterized by panel structure disposed across and mounted on the container and effective to block material leaving the rotor from moving forwardly.

7. The invention defined in claim 6 further characterized by the panel structure being in the form of hood means mounted on the container above the rotor.

8. The invention defined in claim 7 in which the hood means has a forward transverse edge forward of the rotor and has mounted thereon a series of depending elements closely together and supported on the hood means so as to pivot about a transverse axis.

9. The invention defined in claim 6 further characterized by the panel structure having a lower transverse edge, and the panel structure is mounted on the container by means permitting movement thereof whereby the lower transverse edge may be moved to and from a position closely adjacent the floor surface.

References Cited in the file of this patent

UNITED STATES PATENTS

| | | |
|---|---|---|
| 230,871 | George | Aug. 10, 1880 |
| 968,788 | Olander | Aug. 30, 1910 |
| 1,125,122 | Koenig | Jan. 19, 1915 |
| 2,486,214 | Seaholm | Oct. 25, 1949 |
| 2,518,802 | Markel | Aug. 15, 1950 |
| 2,952,466 | Carlson et al. | Sept. 13, 1960 |

FOREIGN PATENTS

| | | |
|---|---|---|
| 805,522 | France | Oct. 22, 1936 |
| 299,827 | Germany | Aug. 11, 1917 |
| 831,027 | Germany | Feb. 11, 1952 |
| 833,723 | Germany | Mar. 10, 1952 |